June 2, 1959  D. N. McCLANAHAN  2,888,700
CLEANING TOOL
Filed Jan. 6, 1958

DAULCE N. MCCLANAHAN
INVENTOR
HUEBNER & WORREL
ATTORNEYS
BY
Richard M. Worrel

United States Patent Office 2,888,700
Patented June 2, 1959

2,888,700
CLEANING TOOL
Daulce N. McClanahan, Lemoore, Calif.
Application January 6, 1958, Serial No. 707,233
5 Claims. (Cl. 15—236)

The present invention pertains to a cleaning tool and more particularly to tongs for cleaning cotton picker spindles and the like.

Cotton picker spindles, as employed in most conventional cotton pickers, usually have substantially cylindrical bearing portions and tapered portions on which are provided a plurality of picking barbs. A single cotton picking machine usually employs over a thousand picker spindles which are rotatably mounted therein in predetermined relation for travel through the cotton plants as the machine traverses the field of cotton. The picking barbs snag the cotton and because of spindle rotation, the cotton is wound around the spindles.

Most of the cotton wrapped around the spindles is removed by doffers. However, inadequate or incomplete doffing frequently leaves a residue of cotton on the spindles which builds up over a period of time. This residual cotton obviously reduces the efficiency of the spindles and therefore, must periodically be removed. In addition, chlorophyll, plant juice, wax, insects, and other foreign matter, frequently collect on the spindles with great tenacity and act as binding agents for cotton fibers.

In the past the cleaning of cotton picker spindles has been largely by hand. Further, blunt instruments, such as screwdrivers, have been employed for scraping the spindles clean. Obviously, this is a time consuming and onerous task considering the very great number and relative inaccessibility of spindles in cotton picking machines.

Accordingly, it is an object of the present invention to provide a tool for cleaning cotton picker spindles.

Another object is to enable residual cotton and other undesirable matter to be removed from a cotton picker spindle in a minimum of time and with a minimum of effort.

Another object is to enable cleaning of cotton picker spindles while in a cotton picking machine.

Another object is to provide a tool adapted successively to clean a plurality of cotton picker spindles notwithstanding their arrangement in a picker drum in relatively closely adjacent relation.

Another object is to provide tongs adapted for scraping engagement with a cotton picker spindle to effect cleaning thereof.

Other objects are to provide cleaning tongs of the nature described which are easy to handle, which are simple and economical to construct and use, which are dependable in operation, and which are highly effective for accomplishing their intended purposes.

These, together with other objects, will become more fully apparent upon reference to the following description.

Figure 1:
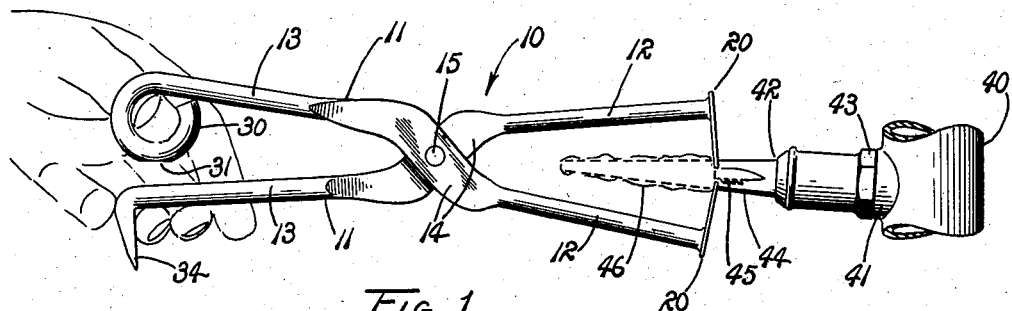
Fig. 1 is a fragmentary side elevation of a cotton picker spindle as mounted in a cotton picking machine and having residual cotton wound therearound. and a cleaning tool embodying the principles of the present invention shown in use for cleaning the spindle.
Figure 2:
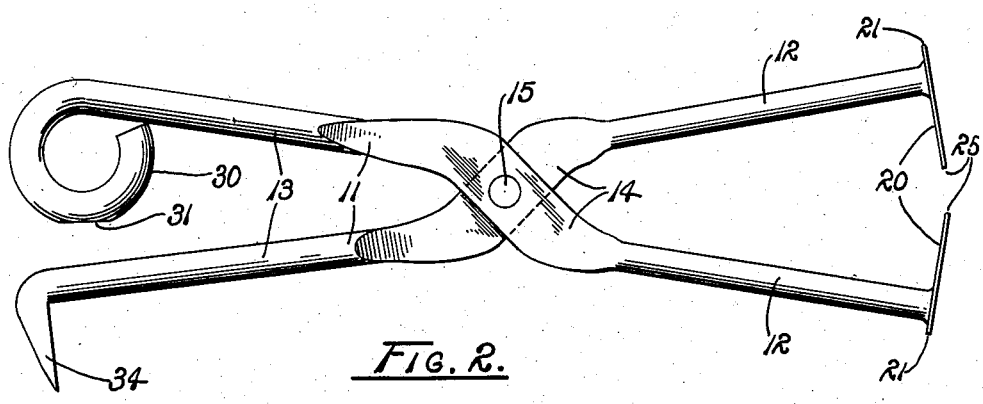
Fig. 2 is a somewhat enlarged side elevation of the cleaning tool of the subject invention in open position.
Figure 3:
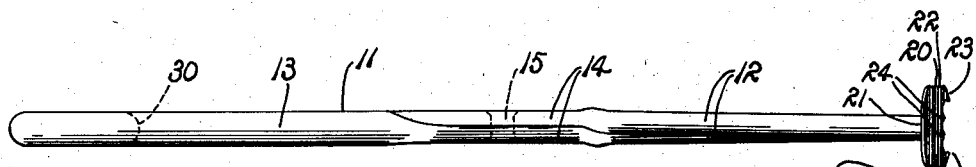
Fig. 3 is a top plan view of the cleaning tool.
Figure 4:
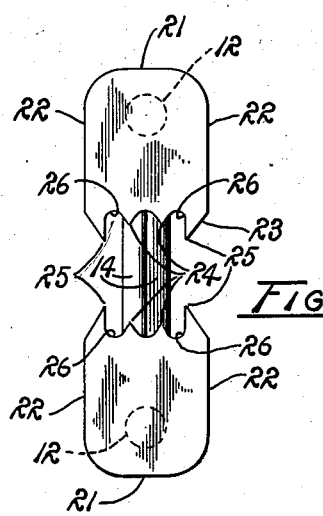
Fig. 4 is a front end view of the tool in open position.

A pair of tongs, as provided by the present invention, are generally indicated by the numeral 10 in the drawing. The tongs include a pair of elongated pivotally interconnected arms 11 conveniently formed from rod material or the like. Each arm has an elongated mounting end portion 12, an elongated handling end portion 13 in laterally offset substantially parallel relation to its respective mounting end portion, and a substantially flat intermediate portion 14 interconnecting its respective mounting and handling end portions in the described association. The intermediate portions of the arms are overlapped and a pivot pin 15 is extended therethrough for pivotally mounting the arms for movement between open and closed positions.

Substantially rectangular blades 20 provide back edges 21, side edges 22 and serrated front edges 23. The blades are rigidly secured, as by welding, to the mounting end portions 12 adjacent to the back edges. The blades are normal to the mounting end portions and extend inwardly toward each other. The front edge of each blade has a pair of inner teeth 24 and a pair of outer teeth 25 which are slightly longer than the inner teeth. The teeth have notches 26 therebetween. The arms 11 and the blades 20 are identical in construction and since the arms are pivoted on their centers, the outer teeth are brought into engagement with each other when the arms are in closed position. For reasons which will subsequently become apparent, the blades are angularly related when the teeth are in engagement so that the teeth are somewhat outwardly extended. This angularity is preferably slightly less than one-hundred and eighty degrees measured at the side of the blades disposed toward the pin 15.

A substantially circular eyelet 30 is integrally provided on the handling end portion 13 of one of the arms 11 and has a flat portion 31 disposed inwardly toward the handling end portion of the other arm. When the arms are in closed position, this flat inner portion abuts the other arm to prevent overlapping of the blades. That is, when the eyelet abuts the arm, the outer teeth 25 are in point-to-point engagement.

A scraping finger 34 is substantially perpendicularly extended outwardly from the handling end portion 13 of the arm 11 opposite to the arm on which the eyelet 30 is provided.

Operation

The operation of the subject invention is best explained by reference to a portion of a cotton picking machine. In Fig. 1, a picker bar 40 is fragmentarily illustrated. A socket member 41 is generally radially extended from the picker bar, and a cotton picker spindle 42 is journaled in the bushing and held therein by means of the spindle nut 43 screw-threadably mounted on the socket member. The spindle has a substantially conical picking portion 44 extended outwardly of the bushing and a plurality of picking barbs 45 are provided on the conical portion for snagging cotton. Further, residual cotton and other foreign matter which it is desired to remove from the spindle are generally indicated by the numeral 46.

In order to clean the spindle 42, the arms 11 are opened to space the teeth 24 and 25 of the blades 20 apart. Preferably the handling end portions 13 of the arms are held in the hand of the operator with the thumb in the eyelet 30 and with one or more of the other fingers grasping the opposite handling end portion, as illustrated in Fig. 1. In this manner the arms can be conveniently opened and closed. With the arms extended longitudinally of the spindle, the blades 20 are closed around the spindle 42 adjacent to the spindle nut 43 so that the inner teeth 24 engage the picking portion 44 at positions substantially diametrically opposed to each other. The angularity of the blades not only enables the biting of the teeth against the material to be removed closely adjacent to the spindle nut but makes possible the dependable stripping action with no tendency on the part of the teeth to bite into the spindle during outward travel thereover. While squeezing the handling end portions 13 together, the arms 11 are pulled longitudinally of the spindle so that the blades 20 scrape over the picking portion of the spindle as they move toward the tip thereof. This scrapes the cotton 46 and other residue from the spindle.

Figure 5:
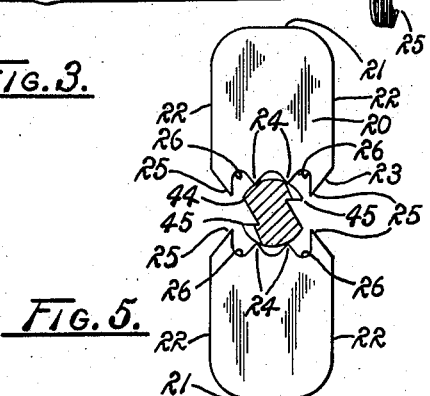
Fig. 5 is a view similar to Fig. 4 showing the tool in scraping engagement with a cotton picker spindle which is illustrated in cross section.

It is significant to note that the blades 20 are substantially perpendicular to the surface of the tapered portion of the spindle during cleaning operations and in this position are found to clean the spindle most effectivley. Further, it is to be noted especially from Fig. 5 that whereas the inner teeth 24 engage the spindle, the outer teeth extend on opposite sides of the spindle in slightly spaced relation thereto. Thus the outer teeth snag cotton scraped and loosened from the spindle by the inner teeth and also help to pull it off from the spindle. In effect the teeth circumscribe the spindle so as to grasp cotton throughout substantially the full circumference of the spindle without actually engaging the entire circumference, as it is not usually desirable to scrape directly over the rows of barbs 45. Additionally, the longer outer teeth may be used effectively in undercut portions adjacent to the rows of picking barbs on the spindle or a pair of teeth, usually the inner teeth, can straddle the barbs whereby such teeth scrape along the lands and flutes adjacent to the barbs. If required the scraping finger 34 may also be used for scraping waxes and other dried matter which adhere with more tenacity to the spindle, bar, or associated mechanisms.

The facility with which the tool of the present invention permits the effective cleaning of many picking spindles in a cotton picker has reduced the time required to perform this task to a small fraction of that previously required. Further, the spindles are thoroughly cleaned without the necessity of removing them from the picking machines in which they are mounted. The described tool is of simple structure and has proved to be a practical and thorough solution to the problems of cleaning picker spindles.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A tool for cleaning a cotton picker spindle having an outer surface of revolution substantially concentric to a predetermined axis and covered with cotton wound therearound comprising a pair of elongated pivotally interconnected arms having opposite mounting and handling end portions and being pivotal between open and closed positions; and flat substantially rectangular scraping blades individually mounted on the mounting end portions of the arms, extended from the arms inwardly toward each other, and having inwardly disposed scraping edges, the edges of the blades providing inner and outer teeth spaced from each other by notches, the outer teeth being longer than the inner teeth and being engageable in the closed postion of the arms whereas the inner teeth are in opposed spaced relation in said closed position.

2. A pair of tongs for cleaning elongated cotton picker spindles having substantially conical picking portions comprising a pair of elongated arms each having oppositely extended mounting and handling end portions in laterally offset substantially parallel relation to each other and substantially flat overlapped intermediate portions interconnecting their respective mounting and handling end portions; scraping blades individually rigidly secured to the mounting end portions, right-angularly extended therefrom and having inwardly disposed serrated scraping edges providing teeth adapted for engagement with the picking portion of a cotton picker spindle so that the blades are substantially normal to the conical picking portions thereof, there being a plurality of intermediate teeth and outer teeth longer than the intermediate teeth, the intermediate portions having openings therein in registration with each other; and a pin extended through the openings in said intermediate portions, at least one of said openings having a sliding fit with the pin for enabling pivotal movement of the arms between closed postions with the outer teeth in engagement and open positions with the teeth spaced apart, one of the handling end portions terminating in an annular finger receiving eyelet extended inwardly toward the other handling end portion for abutment therewith when the teeth are in engagement to prevent overlapping of the blades.

3. A pair of tongs for cleaning elongated cotton picker spindles having substantially conical picking portions concentric to an elongated axis for the spindle comprising a pair of elongated arms each having oppositely extended mounting and handling end portions in laterally offset substantially parallel relation to each other and substantially overlapped flat intermediate portions interconnecting their respective mounting and handling end portions; flat substantially rectangular scraping blades having substantially parallel side edges, back edges and serrated front scraping edges providing laterally spaced inner and outer teeth with the inner teeth being shorter than the outer teeth, the blades being individually rigidly secured to the mounting end portions adjacent to said back edges and right-angularly inwardly extended therefrom, the inner teeth being engageable with the picking portion of a cotton picker spindle on substantially diametrically opposite sides thereof so that the blades are substantially normal to the conical portion thereof and so that the outer teeth extend on opposite sides of the spindle in adjacent spaced relation thereto, the intermediate portions having openings therein in registration with each other; and a pin extended through the openings in said intermediate portions, at least one of said openings having a sliding fit with the pin for enabling pivotal movement of the arms between closed positions with the outer teeth in engagement and open positions with the outer teeth in spaced relation, one of the handling end portions terminating in an annular finger receiving eyelet extended inwardly toward the other handling end portion for abutment therewith when the teeth are in engagement to prevent overlapping of the blades.

4. A tool for cleaning a cotton picker spindle having an outer surface of revolution substantially concentric to a predetermined longitudinal axis and having cotton wound thereon comprising a pair of elongated pivotally interconnected arms having opposite mounting and handling end portions and being pivotal between predetermined open and closed positions; and flat substantially rectangular scraping blades individually mounted on the mounting end portions of the arms, extended from the arms inwardly toward each other, and having inwardly disposed scraping edges, the edges of the blades providing inner and outer teeth spaced from each other by notches, the outer teeth being longer than the inner teeth and being engageable in the closed position of the arms whereas the inner teeth are in opposed spaced relation in said closed position, the blades having an angular relationship to each other in the closed position of the arms of slightly less than one-hundred and eighty degrees measured on the sides of the blades disposed toward the pivotal connection of the arms.

5. The tongs of claim 3 wherein the scraping blades are in slightly less than one-hundred and eighty degrees relation to each other measured on the sides of the blades disposed toward the pin when the outer teeth of the blades are in engagement.

References Cited in the file of this patent

UNITED STATES PATENTS

| | | |
|---|---|---|
| 1,113,986 | Gregson | Oct. 20, 1914 |
| 1,685,977 | Bollerman | Oct. 2, 1928 |